(12) United States Patent
Takamura et al.

(10) Patent No.: US 12,183,491 B2
(45) Date of Patent: Dec. 31, 2024

(54) STACKED VARISTOR

(71) Applicant: Panasonic Intellectual Property Management Co., Ltd., Osaka (JP)

(72) Inventors: Masashi Takamura, Hokkaido (JP); Ken Yanai, Hokkaido (JP); Sayaka Watanabe, Hokkaido (JP); Tomomitsu Muraishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 286 days.

(21) Appl. No.: 17/907,267

(22) PCT Filed: Mar. 18, 2021

(86) PCT No.: PCT/JP2021/011063
§ 371 (c)(1),
(2) Date: Sep. 25, 2022

(87) PCT Pub. No.: WO2021/235071
PCT Pub. Date: Nov. 25, 2021

(65) Prior Publication Data
US 2023/0104285 A1 Apr. 6, 2023

(30) Foreign Application Priority Data

May 21, 2020 (JP) .................... 2020-088513

(51) Int. Cl.
*H01C 7/18* (2006.01)
*H01C 7/112* (2006.01)
(Continued)

(52) U.S. Cl.
CPC .............. *H01C 7/18* (2013.01); *H01C 7/112* (2013.01); *H01G 4/30* (2013.01); *H01G 4/40* (2013.01)

(58) Field of Classification Search
CPC ... H01C 7/18; H01C 7/12; H01G 4/30; H01G 4/40
See application file for complete search history.

(56) References Cited

U.S. PATENT DOCUMENTS

| 4,947,286 A | * | 8/1990 | Kaneko | ..................... H01G 4/01 361/321.2 |
| 5,815,367 A | * | 9/1998 | Asakura | .................... H01G 4/40 333/204 |

(Continued)

OTHER PUBLICATIONS

International Search Report of PCT application No. PCT/JP2021/011063 dated Jun. 8, 2021.

*Primary Examiner* — Kyung S Lee
(74) *Attorney, Agent, or Firm* — Rimon P.C.

(57) ABSTRACT

A stacked varistor having a small variation in electrostatic capacitance is obtained. The stacked varistor includes first internal electrode projection extending from third internal electrode toward first end surface between first side surface and first varistor region, and second internal electrode projection extending from third internal electrode toward second end surface between first side surface and second varistor region. First internal electrode projection extends closer to first end surface than a line connecting point closest to first end surface of first varistor region and point closest to first end surface of third external electrode is. Second internal electrode projection extends closer to second end surface than a line connecting point closest to second end surface of second varistor region and point closest to second end surface of third external electrode is.

3 Claims, 4 Drawing Sheets

(51) Int. Cl.
*H01G 4/30* (2006.01)
*H01G 4/40* (2006.01)

(56) References Cited

U.S. PATENT DOCUMENTS

| | | | |
|---|---|---|---|
| 9,397,632 B2* | 7/2016 | Tan | H01G 4/30 |
| 2018/0226194 A1 | 8/2018 | Kirk et al. | |
| 2020/0343051 A1* | 10/2020 | Kirk | H01C 7/1006 |

* cited by examiner

STACKED VARISTOR

FIELD OF THE INVENTION

The present disclosure relates to a stacked varistor to be used for various electronic devices.

DESCRIPTION OF THE RELATED ART

In recent years, miniaturization of home appliances and in-vehicle electronic devices has progressed, and a varistor which is a component thereof is also required to be miniaturized. Electric signals having a high frequency are also used for electric signals used for home appliances and in-vehicle electronic devices. As the frequency of the electric signals increases, an electrostatic capacitance of the varistor affects the performance of home appliances and in-vehicle electronic devices. Therefore, there is a demand for a varistor having a small electrostatic capacitance and a small variation in electrostatic capacitance while securing a predetermined varistor voltage. Further, in a case where varistors are used in pairs, in order to reduce a difference in electrostatic capacitance between the pairs, it has been proposed that two varistors are formed in one element. Note that, as a technical literature related to this conventional varistor, PTL 1 is known as an example.

CITATION LIST

Patent Literature

PTL 1: US 2018/0226194 A

SUMMARY OF THE INVENTION

However, in the conventional varistor, stray capacitance is generated not only between internal electrodes exhibiting varistor performance but also between an internal electrode and another external electrode. For this reason, in particular, variation in electrostatic capacitance is likely to occur due to variation in external electrode.

In view of the above problem, a stacked varistor of the present disclosure has the following configuration. That is, the stacked varistor of the present disclosure includes a sintered body, a first external electrode, a second external electrode, a third external electrode, a fourth external electrode, a first internal electrode, a second internal electrode, a third internal electrode, a first varistor region, a second varistor region, a first internal electrode projection, and a second internal electrode projection. The sintered body has varistor layers. The sintered body is formed by stacking and firing the varistor layers. Further, the sintered body has a shape of a rectangular parallelepiped. Furthermore, the sintered body has a first side surface, a second side surface, a first end surface, and a second end surface. The first side surface is disposed along a longitudinal direction of the rectangular parallelepiped. The second side surface is disposed parallel to the first side surface. Further, the second side surface is disposed at a position sandwiching the rectangular parallelepiped as viewed from the first side surface. The first end surface is disposed perpendicular to the longitudinal direction of the rectangular parallelepiped. The second end surface is disposed parallel to the first end surface. Further, the second end surface is disposed at a position sandwiching the rectangular parallelepiped as viewed from the first end surface. The first external electrode is provided on the first end surface. The second external electrode is provided on the second end surface. The third external electrode is provided on the first side surface. The fourth external electrode is provided on the second side surface. The first internal electrode is provided inside the sintered body. Further, the first internal electrode is electrically connected to the first external electrode. The second internal electrode is provided inside the sintered body. Further, the second internal electrode is electrically connected to the second external electrode. The third internal electrode is provided inside the sintered body. Further, the third internal electrode is electrically connected to the third external electrode and the fourth external electrode. The first varistor region is formed by overlapping the first internal electrode and the third internal electrode in a stacking direction of the varistor layers. The second varistor region is formed by overlapping the second internal electrode and the third internal electrode in the stacking direction. The first internal electrode projection is located between the first side surface and the first varistor region when the sintered body is viewed from the stacking direction. Further, the first internal electrode projection extends from the third internal electrode toward the first end surface when the sintered body is viewed from the stacking direction. The first internal electrode projection extends to a side of the first end surface beyond a line connecting a point closest to the first end surface of the first varistor region and a point closest to the first end surface of the third external electrode. The second internal electrode projection is located between the first side surface and the second varistor region when the sintered body is viewed from the stacking direction. Further, the second internal electrode projection extends from the third internal electrode toward the second end surface when the sintered body is viewed from the stacking direction. The second internal electrode projection extends to a side of the second end surface beyond a line connecting a point closest to the second end surface of the second varistor region and a point closest to the second end surface of the third external electrode.

With the above configuration, the stacked varistor of the present disclosure can reduce variations in stray capacitance due to variations in the external electrodes. Therefore, the stacked varistor of the present disclosure can reduce the variation in electrostatic capacitance between the pairs of varistors.

DETAILED DESCRIPTION OF THE PREFERRED EMBODIMENTS

Hereinafter, a stacked varistor according to an exemplary embodiment of the present disclosure will be described with reference to the drawing.

Figure 1:
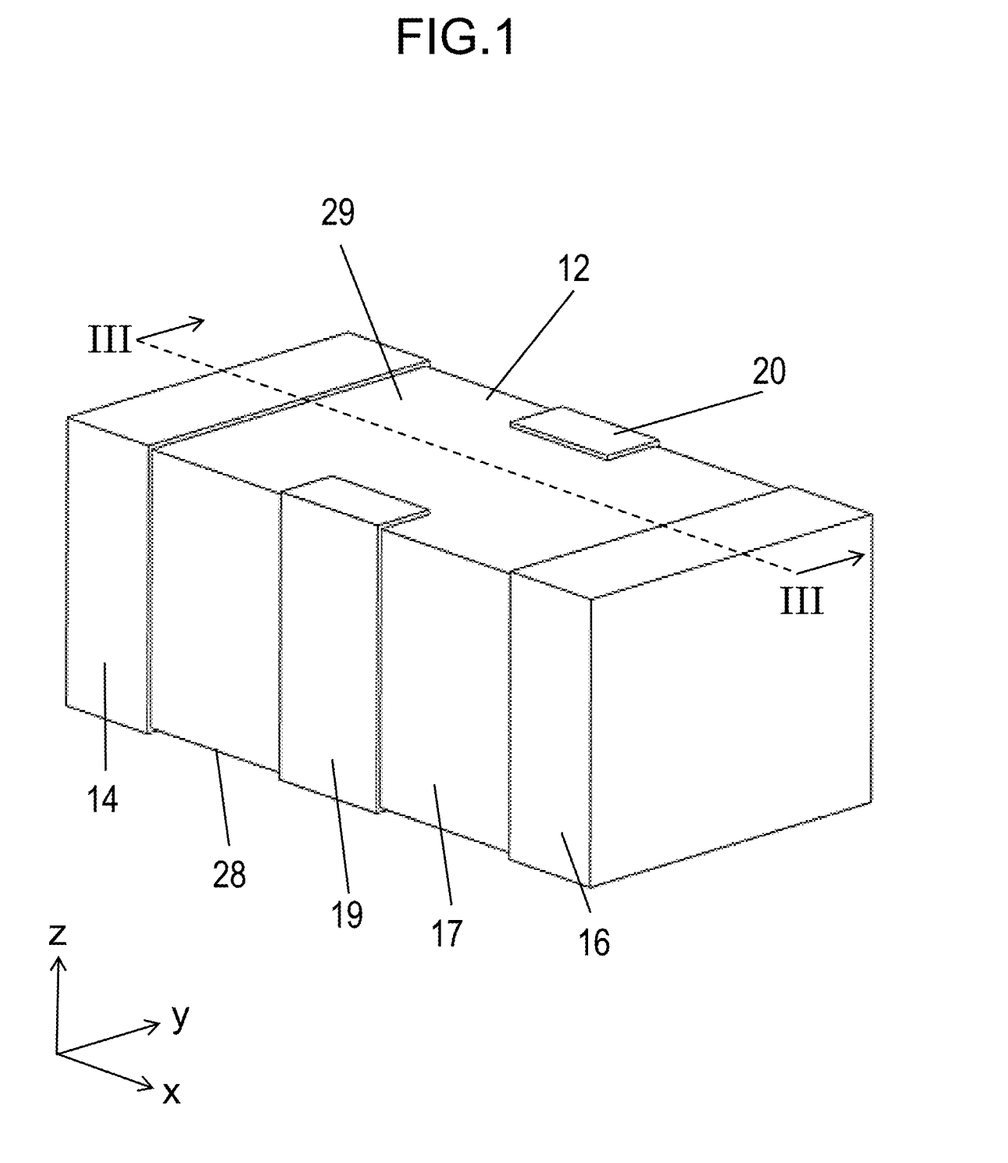
FIG. 1 is a perspective view of a stacked varistor according to an exemplary embodiment of the present disclosure.
Figure 2:
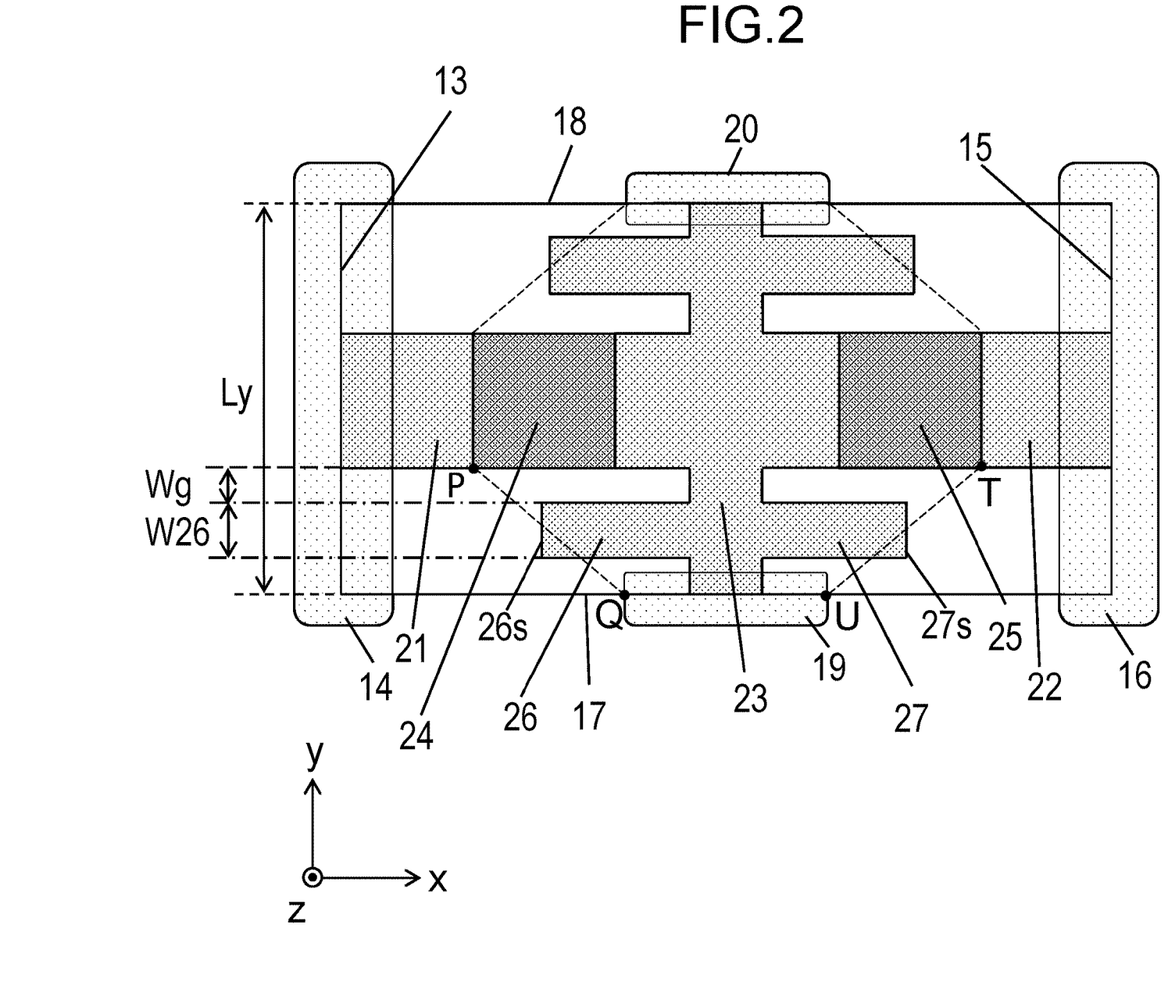
FIG. 2 is a perspective view of the stacked varistor according to an exemplary embodiment of the present disclosure.
Figure 3:
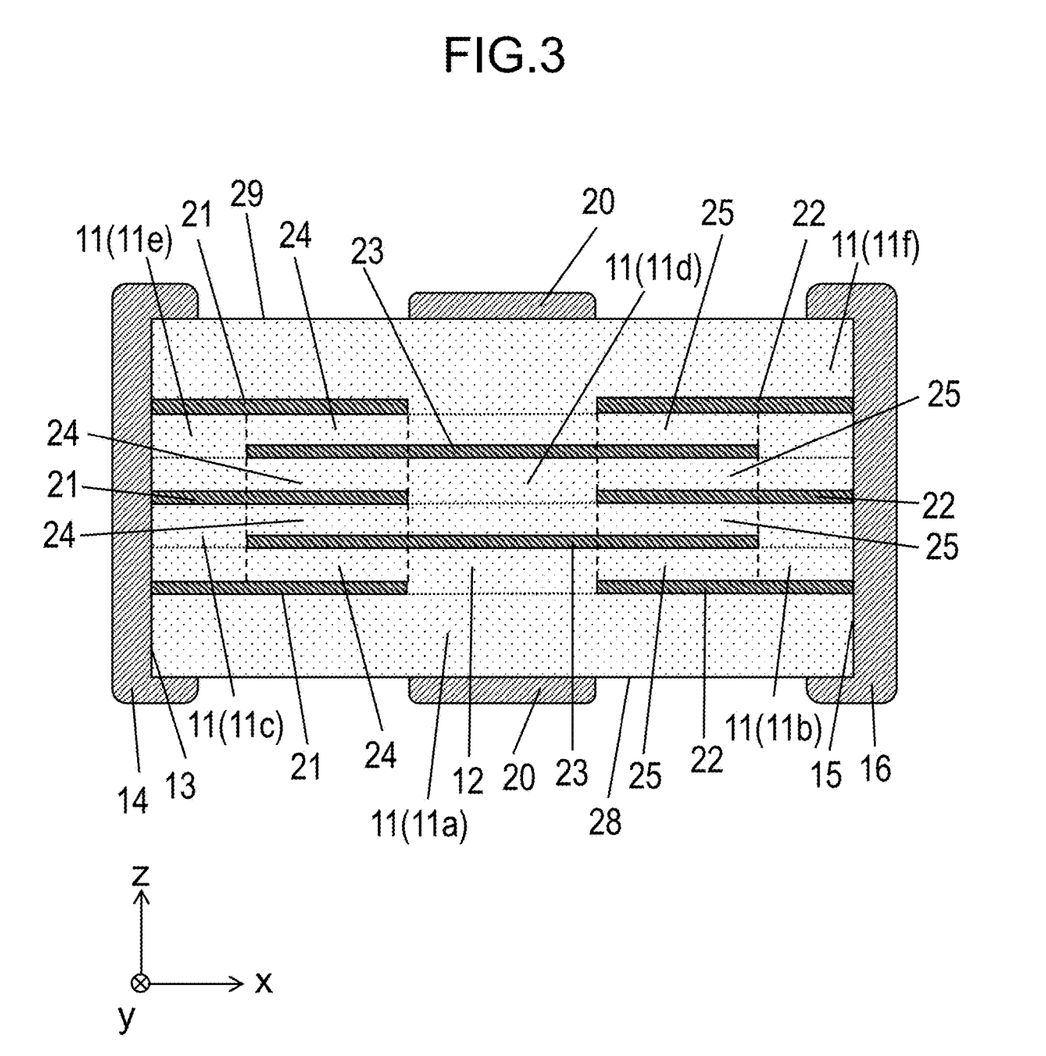
FIG. 3 is a cross-sectional view of the stacked varistor according to an exemplary embodiment of the present disclosure.

FIG. 1 is a perspective view of a stacked varistor according to an exemplary embodiment of the present disclosure, FIG. 2 is a perspective view of the stacked varistor from a stacking direction, and FIG. 3 is a cross-sectional view of the stacked varistor cut in a plane passing through line III-III illustrated in FIG. 1. In each drawing, an xyz orthogonal coordinate system is defined with a length direction of sintered body 12 as an x-axis, a width direction as a y-axis, and a height direction as a z-axis. The height direction coincides with the stacking direction of varistor layers 11. In each drawing, not only a diagram related to the stacked varistor but also the xyz coordinate system is illustrated. Sintered body 12 of the stacked varistor excluding external electrodes has a rectangular parallelepiped shape with a length of 1.6 mm, a width of 0.8 mm, and a height of 0.6 mm.

Sintered body 12 is formed by stacking and sintering varistor layers 11. Sintered body 12 has first end surface 13, second end surface 15, first side surface 17, second side surface 18, lower surface 28, and upper surface 29. First side surface 17 is disposed along a longitudinal direction of the rectangular parallelepiped, that is, the length direction of sintered body 12. Second side surface 18 is parallel to first side surface 17 and is disposed at a position sandwiching the rectangular parallelepiped as viewed from first side surface 17. First end surface 13 is disposed perpendicular to the longitudinal direction of the rectangular parallelepiped. Second end surface 15 is disposed at a position parallel to first end surface 13 and sandwiching the rectangular parallelepiped as viewed from first end surface 13.

First end surface 13 and second end surface 15 are parallel to a yz plane. Further, first side surface 17 and second side surface 18 are parallel to an xz plane. Lower surface 28 and upper surface 29 are parallel to an xy plane. Furthermore, a plane passing through line III-III illustrated in FIG. 1 is parallel to the xz plane.

Varistor layers 11 constituting sintered body 12 contain ZnO as a main component, and contain $Bi_2O_3$, $CO_2O_3$, $MnO_2$, $Sb_2O_3$, or the like, or $Pr_6O_{11}$, $Co_2O_3$, $CaCO_3$, $Cr_2O_3$, or the like as an accessory component. Sintered body 12 has a form in which ZnO is sintered and other accessory components are precipitated at grain boundaries thereof. In sintered body 12, first internal electrode 21, second internal electrode 22, and third internal electrode 23 are formed between stacked varistor layers 11. More specifically, as illustrated in the cross-sectional structure of FIG. 3, sintered body 12 has a structure in which six varistor layers 11, that is, first varistor layer 11a, second varistor layer 11b, third varistor layer 11c, fourth varistor layer 11d, fifth varistor layer 11e, and sixth varistor layer 11f are stacked in this order. First internal electrode 21 and second internal electrode 22 are provided between first varistor layer 11a and second varistor layer 11b. Further, third internal electrode 23 is provided between second varistor layer 11b and third varistor layer 11c. First internal electrode 21 and second internal electrode 22 are provided between third varistor layer 11c and fourth varistor layer 11d. Third internal electrode 23 is provided between fourth varistor layer 11d and fifth varistor layer 11e. First internal electrode 21 and second internal electrode 22 are provided between fifth varistor layer 11e and sixth varistor layer 11f. A surface of first varistor layer 11a opposite to a surface on which second varistor layer 11b is disposed coincides with lower surface 28. Further, a surface of sixth varistor layer 11f opposite to a surface on which fifth varistor layer 11e is disposed coincides with upper surface 29.

First external electrode 14 is provided on first end surface 13 of sintered body 12. First external electrode 14 is provided so as to straddle a part of first side surface 17, a part of the second side surface, a part of lower surface 28, and a part of upper surface 29. First external electrode 14 is electrically connected to first internal electrode 21. Further, second external electrode 16 is provided on second end surface 15. Second external electrode 16 is provided so as to straddle a part of first side surface 17, a part of the second side surface, a part of lower surface 28, and a part of upper surface 29. Second external electrode 16 is electrically connected to second internal electrode 22. Third external electrode 19 is provided on first side surface 17. Third external electrode 19 is provided so as to straddle a part of lower surface 28 and a part of upper surface 29. Third external electrode 19 is electrically connected to third internal electrode 23. Fourth external electrode 20 is provided on second side surface 18. Fourth external electrode 20 is provided so as to straddle a part of lower surface 28 and a part of upper surface 29. Fourth external electrode 20 is electrically connected to third internal electrode 23.

A part of first internal electrode 21 and a part of third internal electrode 23 face each other in the stacking direction to form first varistor region 24. Further, a part of second internal electrode 22 and a part of third internal electrode 23 face each other in the stacking direction to form second varistor region 25.

Sintered body 12 further includes first internal electrode projection 26 and second internal electrode projection 27.

When sintered body 12 is viewed from the stacking direction of varistor layers 11 (a positive direction of the z-axis), as illustrated in FIG. 2, first internal electrode projection 26 is disposed between first side surface 17 and first varistor region 24, and extends in a direction from third internal electrode 23 toward first end surface 13.

A point of first varistor region 24 closest to first end surface 13 is defined as point P. Further, a point of third external electrode 19 closest to first end surface 13 is defined as point Q. A part of first internal electrode projection 26, that is, a part of tip 26s thereof extends at a position closer to first end surface 13 than a line connecting point P and point Q (line segment PQ indicated by a broken line in FIG. 2).

When sintered body 12 is viewed from the positive direction of the z-axis, as illustrated in FIG. 2, second internal electrode projection 27 is disposed between first side surface 17 and second varistor region 25, and extends in a direction from third internal electrode 23 toward second end surface 15.

A point of second varistor region 25 closest to second end surface 15 is defined as point T. Further, a point of third external electrode 19 closest to second end surface 15 is defined as point U. A part of second internal electrode projection 27, that is, a part of tip 27s thereof extends at a position closer to second end surface 15 than a line connecting point T and point U (line segment TU indicated by a broken line in FIG. 2).

By providing first internal electrode projection 26 in this manner, first internal electrode projection 26 straddles line segment PQ. Therefore, even if the shape of third external electrode 19 varies, stray capacitance between first varistor region 24 and third external electrode 19 does not vary. Further, by providing second internal electrode projection 27, second internal electrode projection 27 straddles line segment TU. Therefore, even if the shape of third external electrode 19 varies, stray capacitance between second varistor region 25 and third external electrode 19 does not vary.

In this way, for the stacked varistor, the variation in stray capacitance due to the variation in the shape of third external electrode 19 can be reduced, and as a result, the variation in electrostatic capacitance between the pairs can be reduced.

Modification Example

Figure 4:
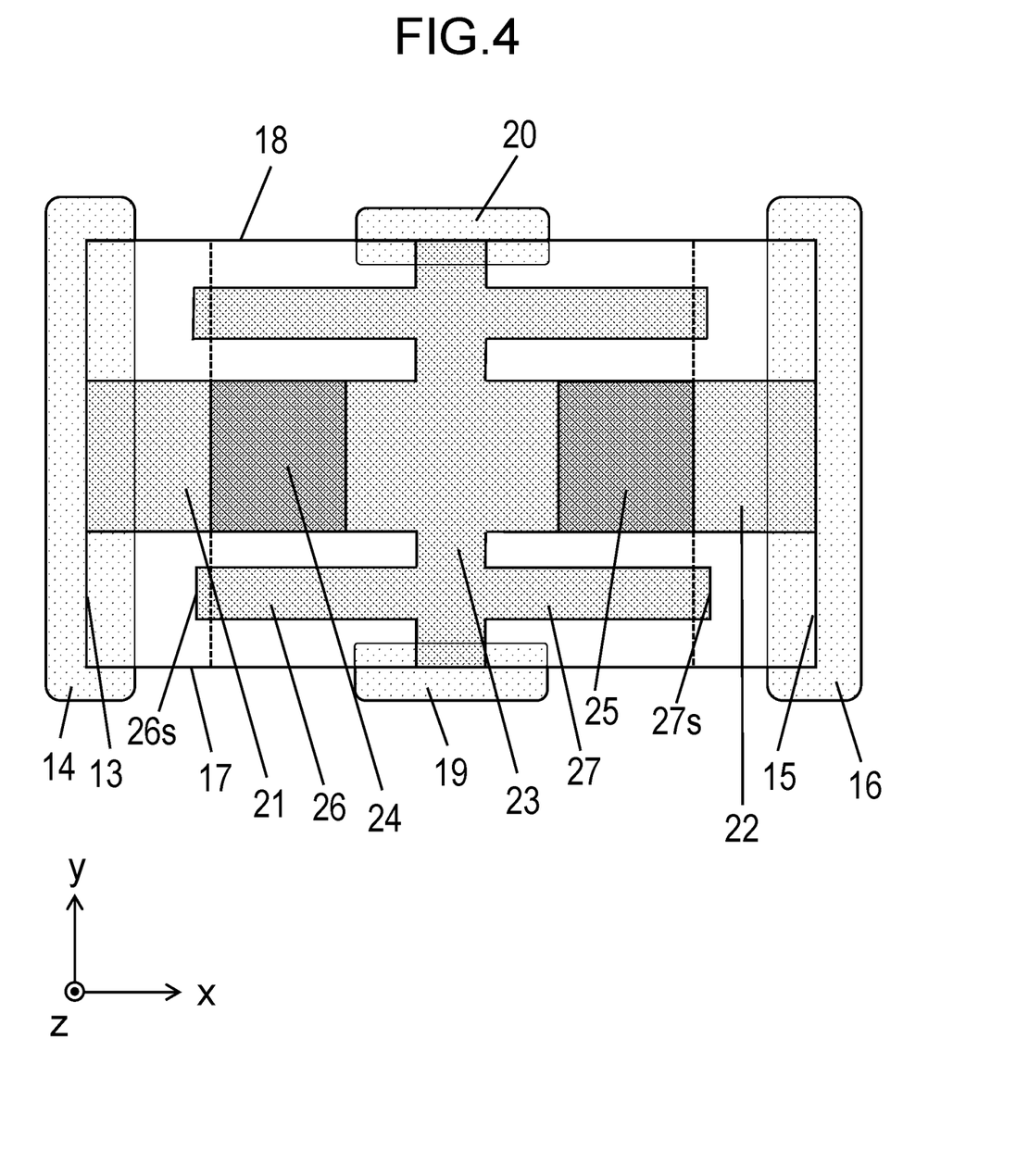
FIG. 4 is a perspective view of a stacked varistor according to a modification example of an exemplary embodiment of the present disclosure.

FIG. 4 illustrates a perspective view of a stacked varistor according to a modification example of an exemplary embodiment of the present disclosure. Since the configuration, appearance, and cross section of the stacked varistor according to this modification example are similar to those of the stacked varistor of the above-described exemplary embodiment illustrated in FIGS. 1 and 3, detailed description of overlapping parts is avoided, and points different from those of the stacked varistor of the above-described exemplary embodiment will be described.

As illustrated in FIG. 4, tip 26s of first internal electrode projection 26 extends so as to be the same as or closer to first end surface 13 than a position closest to first end surface 13 of first varistor region 24. Further, tip 27s of second internal electrode projection 27 extends so as to be the same as or closer to second end surface 15 than a position closest to second end surface 15 of second varistor region 25. By doing so, it is possible to further reduce the variation in the stray capacitance due to the variation in the shape of third external electrode 19.

However, it is desirable that first external electrode 14 and first internal electrode projection 26, and second external electrode 16 and second internal electrode projection 27 do not overlap when sintered body 12 is viewed from the stacking direction. This makes it possible to reduce stray capacitance generated between first external electrode 14 and first internal electrode projection 26 or between second external electrode 16 and second internal electrode projection 27.

Desirable Example

Hereinafter, more desirable examples will be described in the above-described exemplary embodiment and the modification example thereof.

First internal electrode 21 and second internal electrode 22 are desirably formed in the same layer. With such a configuration, production can be efficiently performed.

Further, when sintered body 12 is viewed from the stacking direction, lengths of first internal electrode projection 26 and second internal electrode projection 27 in the y-axis direction are preferably from 5% to 20%, inclusive, of a length of first end surface 13 in the y-axis direction. This will be described with reference to FIG. 2. In FIG. 2, the length of first end surface 13 in the y-axis direction is denoted by Ly, and the length of a projection of first internal electrode projection 26 in the y-axis direction is denoted by W26. Note that the length of a projection of second internal electrode projection 27 in the y-axis direction is equal to the length (W26) of the projection of first internal electrode projection 26 in the y-axis direction. At this time, $0.05Ly \leq W26 \leq 0.2Ly$ is desirable.

When $W26<0.05Ly$, an effect of the internal electrode projections is reduced. Further, when $0.2Ly<W26$, the electrostatic capacitance between third internal electrode 23, and first external electrode 14 and second external electrode 16 increases.

Furthermore, a gap between first internal electrode projection 26 and first varistor region 24 in the y-axis direction is preferably from 10% to 30%, inclusive, of the length of first end surface 13 in the y-axis direction. This will be described with reference to FIG. 2. In FIG. 2, when the gap between first internal electrode projection 26 and first varistor region 24 in the y-axis direction is Wg, $0.1Ly \leq Wg \leq 0.3Ly$ is desirable. When $Wg<0.1Ly$, since a distance between first varistor region 24 and first internal electrode projection 26 is short, the effect of suppressing the variation in stray capacitance is reduced. Note that second internal electrode projection 27 is also similar to first internal electrode projection 26.

In addition, the shape of tip 26s of first internal electrode projection 26 and tip 27s of second internal electrode projection 27 may be any shape, but a rectangular shape is most effective.

Aspects

Aspects of work of the present disclosure will be described below.

A stacked varistor according to a first aspect of the present disclosure includes sintered body (12), first external electrode (14), second external electrode (16), third external electrode (19), fourth external electrode (20), first internal electrode (21), second internal electrode (22), third internal electrode (23), first varistor region (24), second varistor region (25), first internal electrode projection (26), and second internal electrode projection (27).

Sintered body (12) has varistor layers (11). Sintered body (12) is formed by stacking and firing varistor layers (11). Further, sintered body (12) has a rectangular parallelepiped shape. Furthermore, sintered body (12) has first side surface (17), second side surface (18), first end surface (13), and second end surface (15).

First side surface (17) is disposed along a longitudinal direction of the rectangular parallelepiped. Second side surface (18) is disposed parallel to first side surface (17). Further, second side surface (18) is disposed at a position sandwiching the rectangular parallelepiped as viewed from first side surface (17). First end surface (13) is disposed perpendicular to the longitudinal direction of the rectangular parallelepiped. Second end surface (15) is disposed parallel to first end surface (13). Further, second end surface (15) is disposed at a position sandwiching the rectangular parallelepiped as viewed from first end surface (13).

First external electrode (14) is provided on first end surface (13). Second external electrode (16) is provided on second end surface (15). Third external electrode (19) is provided on first side surface (17). Fourth external electrode (20) is provided on second side surface (18).

First internal electrode (21) is provided inside sintered body (12). Further, first internal electrode (21) is electrically connected to first external electrode (14). Second internal electrode (22) is provided inside sintered body (12). Further, second internal electrode (22) is electrically connected to second external electrode (16). Third internal electrode (23) is provided inside sintered body (12). Further, third internal electrode (23) is electrically connected to third external electrode (19) and fourth external electrode (20).

First varistor region (24) is formed by overlapping first internal electrode (21) and third internal electrode (23) in a stacking direction of varistor layers (11). Second varistor region (25) is formed by overlapping second internal electrode (22) and third internal electrode (23) in the stacking direction.

First internal electrode projection (26) is located between first side surface (17) and first varistor region (24) when sintered body (12) is viewed from the stacking direction. Further, first internal electrode projection (26) extends from third internal electrode (23) toward first end surface (13)

when sintered body (12) is viewed from the stacking direction. First internal electrode projection (26) extends to a side of first end surface (13) beyond line (PQ) connecting point (P) closest to first end surface (13) of first varistor region (24) and point (Q) closest to first end surface (13) of third external electrode (19).

Second internal electrode projection (27) is located between first side surface (17) and second varistor region (25) when sintered body (12) is viewed from the stacking direction. Further, second internal electrode projection (27) extends from third internal electrode (23) toward second end surface (15) when sintered body (12) is viewed from the stacking direction. Second internal electrode projection (27) extends to a side of second end surface (15) beyond line (TU) connecting point (T) closest to second end surface (15) of second varistor region (25) and point (U) closest to second end surface (15) of third external electrode (19).

According to this aspect, by providing first internal electrode projection (26), first internal electrode projection (26) straddles line (PQ). Therefore, even if the shape of third external electrode (19) varies, stray capacitance between first varistor region (24) and third external electrode (19) does not vary. Further, by providing second internal electrode projection (27), second internal electrode projection (27) straddles line (TU). Therefore, even if the shape of third external electrode (19) varies, stray capacitance between second varistor region (25) and third external electrode (19) does not vary.

In this way, for the stacked varistor, the variation in stray capacitance due to the variation in the shape of third external electrode (19) can be reduced, and as a result, the variation in electrostatic capacitance between the pairs can be reduced.

In a stacked varistor according to a second aspect of the present disclosure, in the stacked varistor according to the first aspect, tip (26s) of first internal electrode projection (26) extends at a position that is the same as a point closest to first end surface (13) of first varistor region (24) or closer to first end surface (13) than the point closest to first end surface (13) of first varistor region (24) is. Further, tip (27s) of second internal electrode projection (27) extends at a position that is the same as a point closest to second end surface (15) of second varistor region (25) or closer to second end surface (15) than the point closest to second end surface (15) of second varistor region (25) is.

According to this aspect, it is possible to further reduce the variation in stray capacitance due to the variation in the shape of third external electrode (19).

A stacked varistor according to a third aspect of the present disclosure has the following configuration in the stacked varistor according to the first aspect or the second aspect. A direction perpendicular to first end surface (13) and second end surface (15) is defined as an x-axis, and a direction perpendicular to first side surface (17) and second side surface (18) is defined as a y-axis. At this time, lengths of first internal electrode projection (26) and second internal electrode projection (27) in the y-axis direction are from 5% to 20%, inclusive, of a length of first end surface (13) of sintered body (12) in the y-axis direction. Further, a gap between first internal electrode projection (26) and first varistor region (24) in the y-axis direction is from 10% to 30%, inclusive, of the length of first end surface (13) in the y-axis direction.

The stacked varistor according to the present disclosure can reduce variations in stray capacitance due to variations in the positions of external electrodes, and is industrially useful.

The invention claimed is:

1. A stacked varistor comprising
a sintered body including varistor layers stacked, the sintered body having a shape of a rectangular parallelepiped, the sintered body including:
   a first side surface disposed along a longitudinal direction of the rectangular parallelepiped,
   a second side surface disposed at a position opposed to the first side surface,
   a first end surface disposed at a position being sandwiched by the first side surface and the second side surface, and
   a second end surface disposed at a position opposed to the first end surface;
a first external electrode provided on the first end surface;
a second external electrode provided on the second end surface;
a third external electrode provided on the first side surface;
a fourth external electrode provided on the second side surface;
a first internal electrode provided inside the sintered body and electrically connected to the first external electrode;
a second internal electrode provided inside the sintered body and electrically connected to the second external electrode;
a third internal electrode provided inside the sintered body and electrically connected to the third external electrode and the fourth external electrode;
a first varistor region formed by overlapping the first internal electrode and the third internal electrode in a stacking direction of the varistor layers;
a second varistor region formed by overlapping the second internal electrode and the third internal electrode in the stacking direction;
a first internal electrode projection extending from the third internal electrode toward the first end surface between the first side surface and the first varistor region when the sintered body is viewed from the stacking direction; and
a second internal electrode projection extending from the third internal electrode toward the second end surface between the first side surface and the second varistor region when the sintered body is viewed from the stacking direction,
wherein
the first internal electrode projection extends to a side of the first end surface beyond a line connecting (i) a point closest to the third external electrode among points closest to the first end surface of the first varistor region and (ii) a point closest to the first end surface of the third external electrode, and
the second internal electrode projection extends to a side of the second end surface beyond a line connecting (i) a point closest to the third external electrode among points closest to the second end surface of the second varistor region and (ii) a point closest to the second end surface of the third external electrode.

2. The stacked varistor according to claim 1, wherein
the first internal electrode projection includes a tip extending at a position that is a same distance as a point closest to the first end surface of the first varistor region or closer to the first end surface than the point closest to the first end surface of the first varistor region is, and
the second internal electrode projection includes a tip extending at a position that is a same distance as a point closest to the second end surface of the second varistor region or closer to the second end surface than the point closest to the second end surface of the second varistor region is.

3. The stacked varistor according to claim 1, wherein when a direction perpendicular to the first side surface and the second side surface is defined as a y-axis, each of a length of the first internal electrode projection and a length of the second internal electrode projection along the y-axis is from 5% to 20%, inclusive, of a length of the first end surface of the sintered body along the y-axis, and a gap between the first internal electrode projection and the first varistor region along the y-axis is from 10% to 30%, inclusive, of the length of the first end surface along the y-axis.

* * * * *